United States Patent
Jansson

(10) Patent No.: US 11,052,615 B2
(45) Date of Patent: Jul. 6, 2021

(54) WELDING APPARATUS HAVING A SAFETY FEATURE

(71) Applicant: Conroy Medical AB, Upplands Väsby (SE)

(72) Inventor: Per Jansson, Sigtuna (SE)

(73) Assignee: Conroy Medical AB, Upplands Väsby (SE)

( * ) Notice: Subject to any disclaimer, the term of this patent is extended or adjusted under 35 U.S.C. 154(b) by 295 days.

(21) Appl. No.: 16/329,771

(22) PCT Filed: Aug. 15, 2017

(86) PCT No.: PCT/EP2017/070667
§ 371 (c)(1),
(2) Date: Mar. 1, 2019

(87) PCT Pub. No.: WO2018/041627
PCT Pub. Date: Mar. 8, 2018

(65) Prior Publication Data
US 2019/0240922 A1    Aug. 8, 2019

(30) Foreign Application Priority Data
Sep. 2, 2016  (SE) .................................. 1651178-4

(51) Int. Cl.
*B29C 65/00*  (2006.01)
*B29C 65/18*  (2006.01)
(Continued)

(52) U.S. Cl.
CPC .......... *B29C 66/8742* (2013.01); *B29C 65/04* (2013.01); *B29C 65/18* (2013.01);
(Continued)

(58) Field of Classification Search
None
See application file for complete search history.

(56) References Cited

U.S. PATENT DOCUMENTS 4,496,819 A * 1/1985 Acker ..................... B29C 65/04
219/769
4,529,859 A * 7/1985 Minney ................... B29C 65/04
156/358

(Continued)

FOREIGN PATENT DOCUMENTS

WO    2016/083459 A1    6/2016

OTHER PUBLICATIONS

International Search Report and Written Opinion for corresponding Patent Application No. PCT/EP2017/070667 dated Dec. 14, 2017.

*Primary Examiner* — Hemant Desai
*Assistant Examiner* — Tanzim Imam
(74) *Attorney, Agent, or Firm* — Renner, Otto, Boisselle & Sklar LLP

(57) ABSTRACT

Welding apparatus (10; 30) having a safety feature comprising: two electrodes (11, 12; 21, 22), whereof at least one of said two electrodes is movably arranged in relation to the other electrode. The electrodes are in non-contact with each other and define a gap (13) in which an object (14) provided with an electrically non-conductive surface to be sealed may be inserted. The welding apparatus comprises an actuator (15; 25) configured to move at least one electrode when activated to squeeze the object, a detector (16; 26) configured to determine a clamping force when the inserted object (14) is squeezed between the electrodes, a distance sensor (17; 23) configured to measure the distance between the electrodes. There is also a conductance sensor (24) configured to measure the conductivity of an object located between the electrodes (11, 12; 21,22) when the object (14) is squeezed, and optionally a position sensor (19*b*) configured to detect the position of the object (14) inserted between the electrodes. The welding apparatus further comprises a processor configured to process the input from at least one of the detector (16; 26), the distance sensor (17; 23)

(Continued)

and the conductance sensor (24) to provide an output that indicates if there is a blood bag tube inserted between electrodes, or if it is a foreign object.

10 Claims, 6 Drawing Sheets

(51) Int. Cl.
  *B29C 65/04* (2006.01)
  *B29L 31/00* (2006.01)
  *B29C 65/08* (2006.01)
  *H05B 6/62* (2006.01)

(52) U.S. Cl.
  CPC ...... *B29C 66/1122* (2013.01); *B29C 66/4312* (2013.01); *B29C 66/8322* (2013.01); *B29C 66/83221* (2013.01); *B29C 66/857* (2013.01); *B29C 66/8618* (2013.01); *B29C 66/8746* (2013.01); *B29C 66/9161* (2013.01); *B29C 66/9221* (2013.01); *B29C 66/9231* (2013.01); *B29C 66/94* (2013.01); *B29C 66/944* (2013.01); *B29C 66/959* (2013.01); *B29C 66/961* (2013.01); *B29C 65/08* (2013.01); *B29C 66/9672* (2013.01); *B29L 2031/7148* (2013.01); *B29L 2031/753* (2013.01); *H05B 6/62* (2013.01)

(56) References Cited

U.S. PATENT DOCUMENTS

| | | | | |
|---|---|---|---|---|
| 5,349,166 A * | 9/1994 | Taylor | ............ | B29C 65/04 219/643 |
| 5,890,643 A * | 4/1999 | Razon | ............ | H01L 24/85 228/1.1 |
| 6,167,677 B1 * | 1/2001 | Kammler | ............ | B29C 66/7373 53/75 |
| 2012/0311975 A1 * | 12/2012 | Kamigaito | ............ | B29C 66/8122 53/548 |
| 2014/0352253 A1 * | 12/2014 | Yamamoto | ............ | B29C 66/0062 53/76 |
| 2017/0266870 A1 * | 9/2017 | Lepple-Wienhues | ............ | B29C 66/8322 |

* cited by examiner

WELDING APPARATUS HAVING A SAFETY FEATURE

TECHNICAL FIELD

The present invention relates generally to welding apparatuses for plastic welding, more particularly for plastic tubes, and specifically it relates to a safety feature for preventing injury to operators.

BACKGROUND TO THE INVENTION

Welding apparatuses are normally used for sealing different containers designed to contain blood, such as blood bags or tubes connected to blood bags. Due to the plastic material used to manufacture blood bags and tubes, ultrasound or RF welding techniques are commonly used; such equipment is provided by the applicant and shown in FIG. 1.

Blood bags and tubes come in many different sizes and shapes, which in turn require the user to have access to different welding equipment adapted for a specific material, shape or thickness. Typically, a user has to seal the plastic tube when the blood bag is full, but may also have to seal of a part of the blood bag for test samples, which requires the user to have access to different welding equipment to perform the required tasks.

When sealing different containers designed to contain blood, such as blood bags, welding techniques (ultrasound or RF) are normally used. Such a product (CS546 Qseal-handy) is provided by Conroy Medical, and is shown in FIG. 1. It comprises a battery pack 2 (i.e. a DC source), a device for welding 1, which is normally hand-held, and a cord/cable 3 for connecting the battery pack with the hand-held device. Such devices can also be powered from the AC mains via a suitable cord. The Qseal-handy is a fully automatic system for sealing PVC and EVA tubes connected to blood bags included either in Blood Packs or in Apheresis Disposable Sets. The sealing can be performed when the donor is still connected to the Blood Pack or the Apheresis Disposable Set.

The prior art devices can distinguish between different tubes (e.g. thickness/diameter, material resilience etc.), but do not have the ability to detect whether e.g. a finger is inadvertently inserted in the welding area between electrodes. In view of the high energies used for welding human tissue can potentially be severely damaged in such instances.

Thus, there is a need to develop a welding apparatus that can distinguish e.g. human tissue in the form of a finger from plastic tubes, and to abort operation if such detection is made.

SUMMARY OF THE INVENTION

The object with the present invention is to provide a welding apparatus which has a safety feature that prevents operator injury.

The object may be achieved with a welding apparatus comprising:

The benefit and advantage over prior art with the invention is that tampering with the welder cannot cause severe burn damage to operators of the apparatus.

Further objects and advantages will be apparent for a skilled person from the detailed description and the drawings.

DETAILED DESCRIPTION OF THE PREFERRED EMBODIMENTS

For the purpose of this invention and the description thereof a "processor" shall be taken to encompass any device capable of performing the required functions, i.e. both digital and analog devices.

Figure 1:
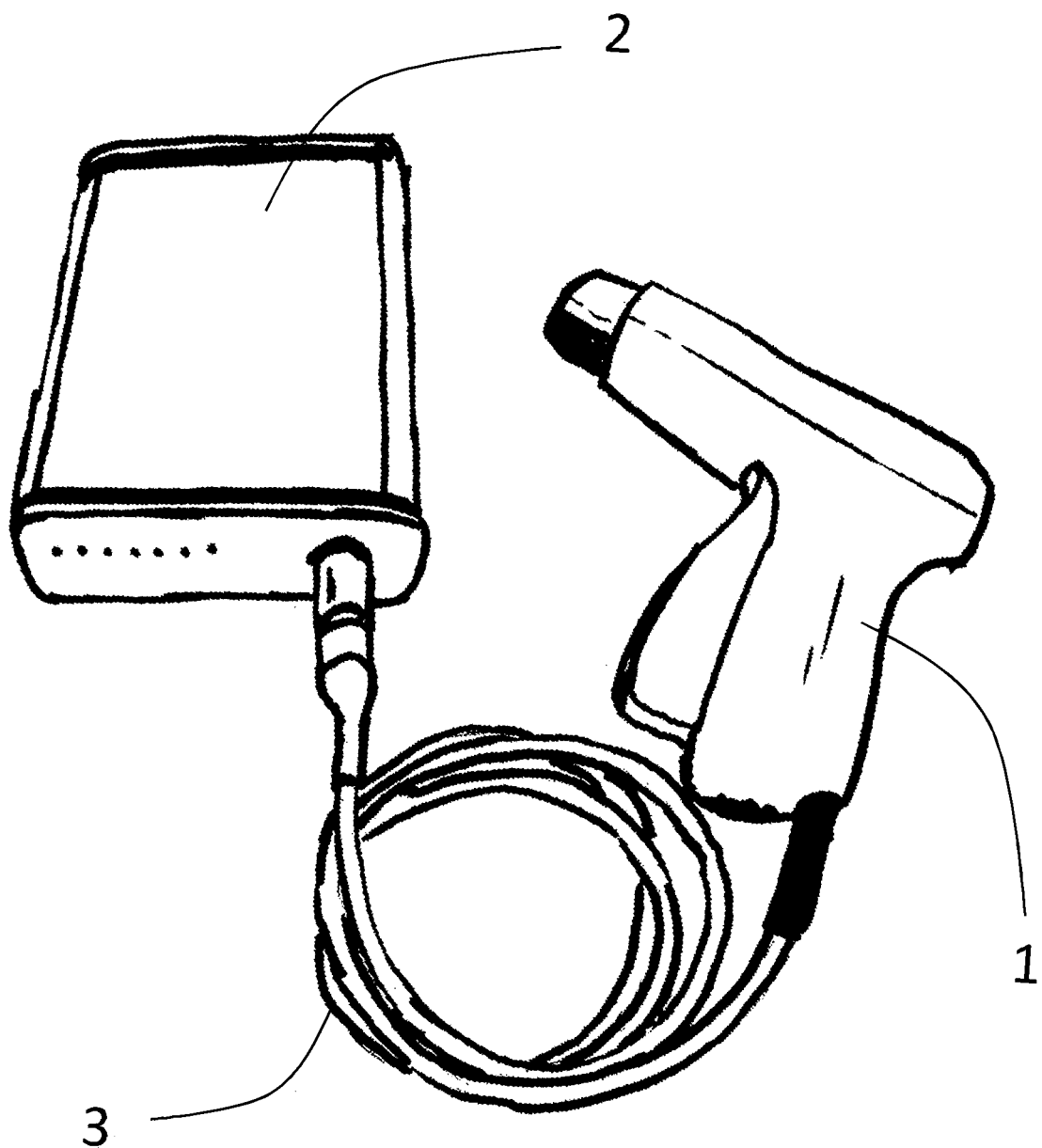
FIG. 1 shows a prior art welding apparatus.

FIG. 1 illustrates a prior art welding apparatus having a welding unit 1 attached via a cord 2 to a battery pack 3.

Figure 2:
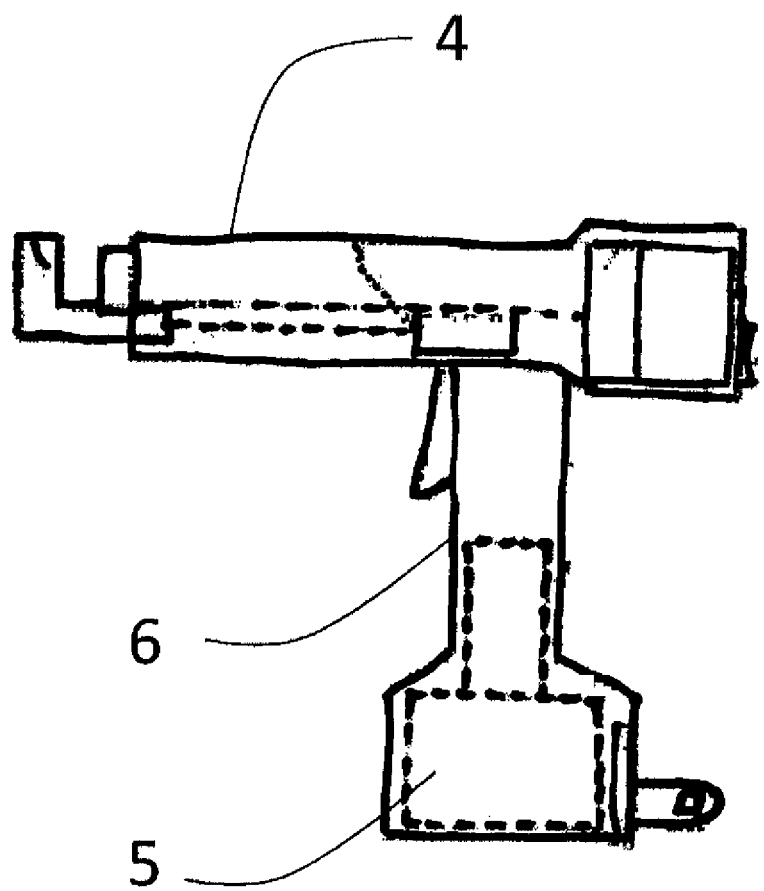
FIG. 2 shows a cordless prior art welding apparatus.

FIG. 2 illustrates a cordless welding apparatus comprising two parts, a first unit in the form of a power unit 5 with a battery pack, and a second unit in the form of a welder 4. The power unit is inserted in a slot in the handle 6 of the apparatus. As mentioned in the background of course power can be obtained from the grid as well, or any other external source, although from a user perspective the cordless embodiment with a battery pack in the handle is preferred.

As previously mentioned, a drawback of the prior art welding apparatuses is that they have no safety system for avoiding operator injury due to inadvertent and inappropriate tampering with the welder.

Figure 3:
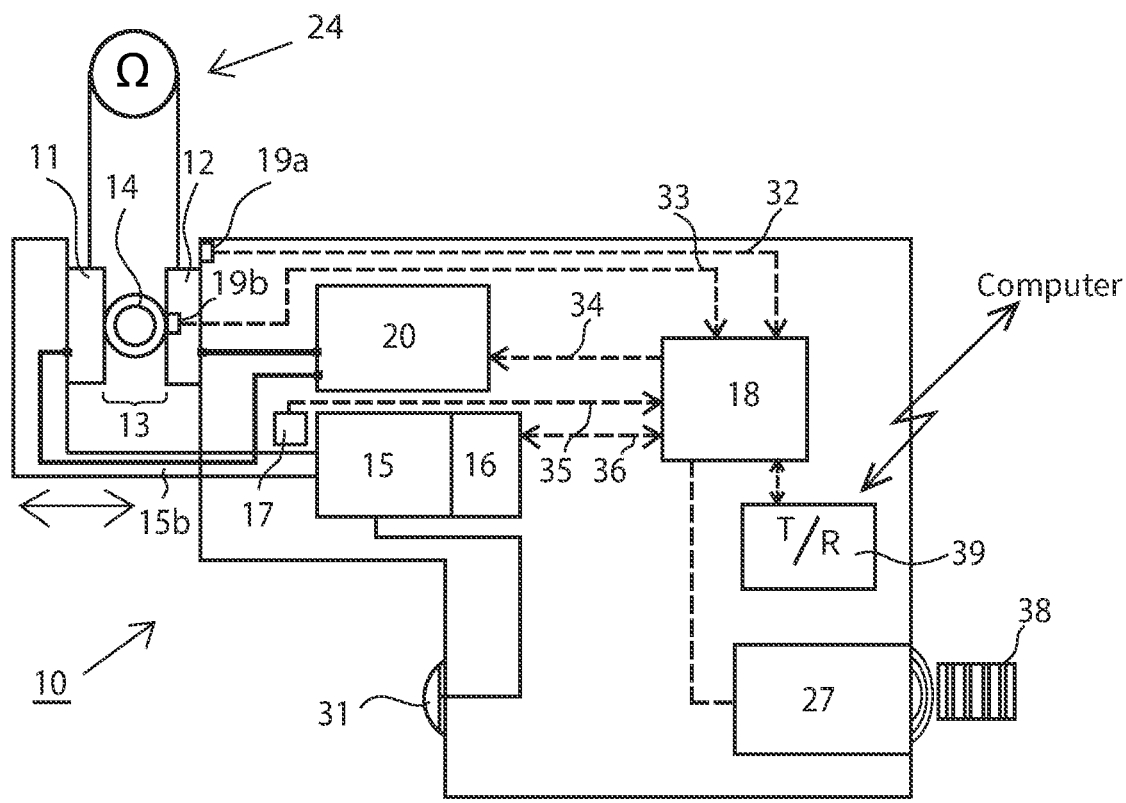
FIG. 3 shows a first embodiment of a welding apparatus.

FIG. 3 shows a first embodiment of a welding apparatus 10 comprising two electrodes 11, 12, an actuator 15, a power source 20, a clamping force detector 16, a distance sensor 17 configured to measure the distance between the electrodes when the object is squeezed, a conductance sensor 24 configured to measure the conductance between the electrodes when the object is squeezed, and a processor 18 configured to determine if there is a proper object, e.g. blood bag tube inserted between electrodes, or if it is a foreign object, e.g. a finger, based on input from at least one of detector 16 and sensors 17, 24.

Now operation of the welder will be described in general, and specifically the safety feature will be described, with reference to FIG. 3.

A first of the electrodes 11 is movably arranged in relation to the other electrode 12, which is stationary, and the two electrodes are in non-contact with each other. A gap 13 is defined between the electrodes in which gap an object 14 to be sealed may be inserted. An object 14 which is to be welded, such as plastic tubes or plastic bags, is provided with an electrically non-conductive surface, and is typically manufactured from an electrically non-conductive material.

When activated, the actuator 15 (e.g. a step motor, brushless DC motor, etc.) is configured to move the first electrode 11 towards the other electrode 12 to close the gap 13 when the object 14 is inserted within the gap 13. The power source 20 is configured to provide energy to the electrodes to perform a welding procedure provided that a control signal 34 from the processor 18 is received that controls the time and/or energy needed to perform the welding procedure.

In order to calculate the time and/or energy needed to perform the welding procedure, information regarding the object needs to be collected. The clamping force detector 16 is configured to determine a clamping force and the distance sensor 17 is configured to measure a distance between the electrodes when the inserted object 14 is squeezed between the electrodes 11, 12. The clamping force may be determined by detecting the clamping force or by calculating the clamping force based on power consumption (current and voltage to a DC motor)

The determined clamping force and the measured distance are indicators regarding what type of properties the object has, i.e. tube or sheet; thickness and type of material. More particularly, the clamping force $F_{clamp}$ is recorded as a function of displacement of the moving electrode, i.e. distance between electrodes (or some equivalent relative measure of position in space or time). Thus, the force $F_{clamp}$ will have a certain profile for a certain material, depending on the resilience/rigidity of the material.

The processor calculates time and/or amount of energy required to perform the welding procedure on the inserted object based on the determined clamping force profile and measured distance between the electrodes.

The processor 18 is provided with a memory in which data corresponding to clamping force profiles for different materials, and for performing controlled welding based on input data from detectors and sensors. Thus, the processor retrieves data from the memory regarding an appropriate welding procedure as a function of clamping force and distance between the electrodes. The data is preferably stored in a look-up table. Furthermore, separate look-up tables may be implemented for different materials, and information regarding which material the object is made from can be obtained from a user, e.g. using a built-in bar-code reader 27 that reads the information from a barcode 28 and a signal 29 with the information is forwarded to the processor 18 to select the correct look-up table to be used for the welding procedure.

Furthermore, the welding apparatus 10 may be provided with a wireless communication interface, such as a transceiver circuitry 39, to facilitate wireless communication with external equipment, such as a computer, to exchange information. This type of information may comprise updated data to be stored in the look-up tables, and also data to be stored in a new look-up table, to adapt and thereby optimize the welding procedure. Information regarding the type of material in the object inserted in the gap may also be provided to the processor via the wireless communication interface.

The distance sensor 17 is configured to measure the distance between the electrodes by monitoring the movement of the first electrode 11 in relation to the other electrode 12. In this embodiment, this is achieved by a sensor arranged to monitor the movement of a rod 15b controlled by the actuator 15 which is attached to the first electrode 11.

Optionally, a further sensor 19a may be provided to detect if the object 14 is partly outside the defined gap 13, and the processor 18 is in this case further configured to prevent the actuator 15 to be activated when the object 14 is detected to be partly outside the defined gap 13. Thus, preventing a poor weld on the object 14.

The detection of a very thin material (based on the measured distance between the electrodes) outside the gap 13 may also be used to confirm that the object is a plastic sheet and ensure that a proper welding procedure is used.

Optionally, an additional position sensor 19b is provided to detect the position of the object 14 inserted between the electrodes, and the processor 18 is in this case further configured to enable said actuator 15 to be activated when the additional position sensor detects that the object is placed between the electrodes 11, 12. Thus, the signal from the additional position sensor prevents the welding procedure from being activated when no object is inserted between the electrodes. The signal from the additional position sensor may also be used as an indication that the actuator should be activated, whereby a separate button 31 as discussed below is not required.

The power source 20 may comprise a battery which is activated by a control signal 34 from the processor 18. When the actuator 15 is activated, either by pressing a button 31 or by detecting the presence of an object in the gap 13, the gap is reduced. In case where the second sensor 19a and/or third sensor 19b is implemented, signals 32 and 33 are forwarded to the processor, which sends an enable signal (as indicated by 36) to the actuator before it may be activated. When the object 14 (inserted between the electrodes) is squeezed, the processor 18 receives signals from the clamping force detector 16 (as indicated by 36) and the first sensor 17 (as indicated by 35). The processor 18 thereafter calculates the required time and/or energy needed to perform the welding procedure.

Figure 4:
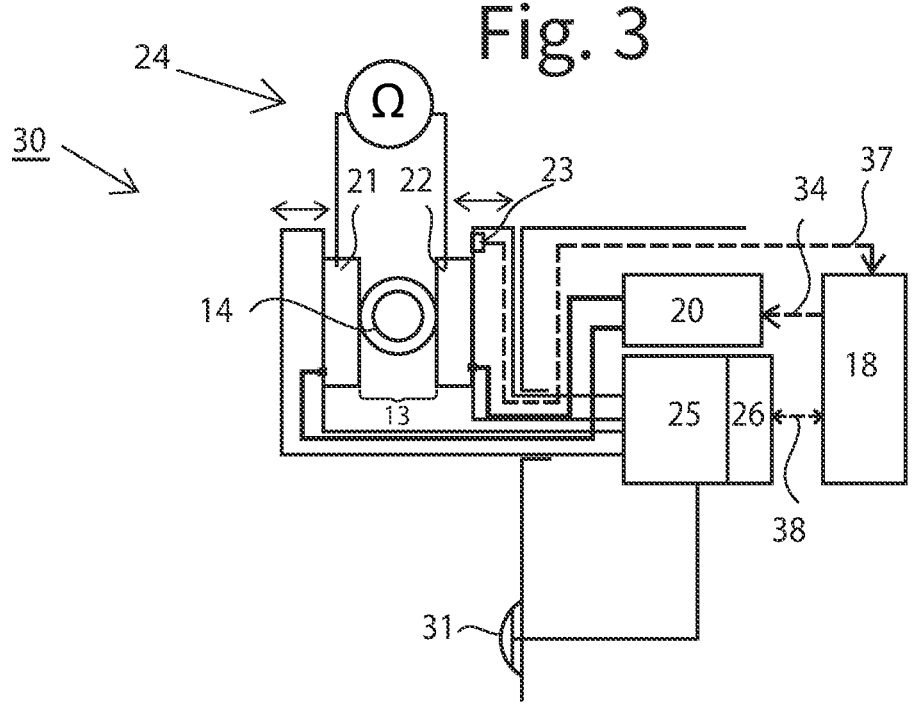
FIG. 4 shows a second embodiment of a welding apparatus.

FIG. 4 shows a second embodiment of a welding apparatus 30 comprising two electrodes 21, 22, an actuator 25, a power source 20, a clamping force detector 26, a distance sensor 23, a conductance sensor 24 and a processor 18.

In this embodiment, each electrode 21, 22 are movable in relation to the other and the movement is controlled by the actuator 25, and the two electrodes are in non-contact with each other. A gap 13 is defined between the electrodes in which an object 14 to be sealed may be inserted. The object 14, such as plastic tubes or plastic bags, is provided with an electrically non-conductive surface, and is typically manufactured from an electrically non-conductive material.

The actuator 25 is configured to move the first electrode 21 and second electrode 22 towards each other to close the gap 13 when the object 14 is inserted within the gap 13. The power source 20 is configured to provide energy to the electrodes to perform a welding procedure provided that a control signal 34 from the processor 18 is received that controls the time and/or energy needed to perform the welding procedure.

In order to calculate the time and/or energy needed to perform the welding procedure, information regarding the object needs to be collected. The clamping force detector 26 is configured to determine a clamping force and the distance sensor 23 is configured to measure a distance between the electrodes when the inserted object 14 is squeezed between the electrodes 21, 22. Information regarding type of material may be obtained using a bar-code reader (not shown) or through a wireless communication interface as previously discussed in connection with FIG. 3.

The determined clamping force and the measured distance are indicators regarding what type of properties the object has, i.e. tube or sheet; thickness and type of material, but external information provided by a bar-code reader or through a wireless communication interface may also be provided. The processor calculates time and/or amount of energy required to perform the welding procedure on the inserted object based on the determined clamping force and measured distance between the electrodes, as described above.

In this embodiment, the distance sensor 23 is an optical rangefinder configured to measure the distance between the electrodes by monitoring the movement of one electrode in relation to the other electrode using light.

Optionally, a further sensor (not shown) may be provided to detect if the object 14 is partly outside the defined gap 13, and the processor 18 is in this case further configured to prevent the actuator 25 to be activated when the object 14 is detected to be partly outside the defined gap 13. Thus, preventing a poor weld on the object 14. The second sensor may be integrated into the first sensor 23.

Optionally, an additional position sensor (not shown) is provided to detect the position of the object 14 inserted between the electrodes, and the processor 18 is in this case further configured to enable said actuator 25 to be activated when the third sensor detects that the object is placed between the electrodes 21, 22. Thus, the signal from the additional position sensor prevents the welding procedure to be activated when no object is inserted between the electrodes, and the signal may also be used to activate the actuator instead of using a separate button 31.

According to the invention there is also provided a conductance sensor 24 which is configured to measure the conductance between the electrodes when an object inserted in the gap between the electrodes is squeezed.

Thus, a welding apparatus having a safety feature comprises at least one of a) a detector 16 configured to determine a clamping force when the inserted object is squeezed between the electrodes, b) a distance sensor 17 configured to measure the distance between the electrodes when the object is squeezed, c) a conductance sensor 24 configured to measure the conductance between the electrodes when the object is squeezed. The apparatus also comprises a processor configured to process the input from at least one of the detector and sensors to provide an output that indicates if there is a proper object (e.g. a blood bag tube) inserted between electrodes, or if it is a foreign object (e.g. a finger).

Figure 6:
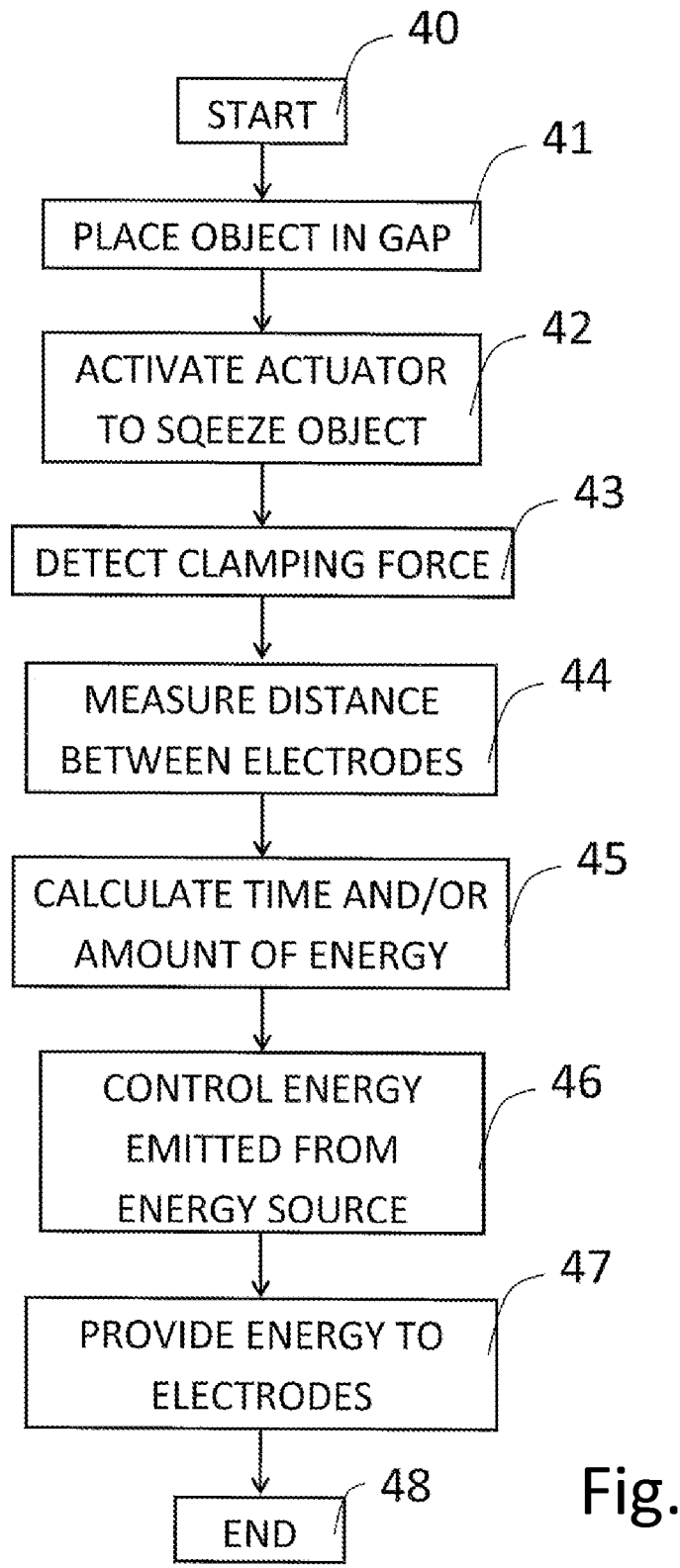
FIG. 6 shows a flow chart describing a method to perform a welding procedure.

The conductance sensor 24 can be implemented by connecting an Ohm-meter across the electrodes, as shown in FIG. 6. Conductance (G, in Siemens) is the reciprocal of Resistance (R), i.e. G=1/R. Thus, conductance is easily calculated.

Since the objects intended for use in the welding apparatus have low conductance, e.g. plastic tubes, a conductance measurement will be an excellent means for distinguishing between tubes and e.g. human tissue (skin) which exhibits a conductance orders of magnitude larger.

For the same reason the clamping force exerted will differ between tubes and other objects. Also, the diameter of a tube is significantly smaller than that of e.g. a finger, and thus the output of the distance sensor can also be used for this purpose.

However, the optimal assessment is based on a combination of all outputs from detector/sensors.

Figure 5:
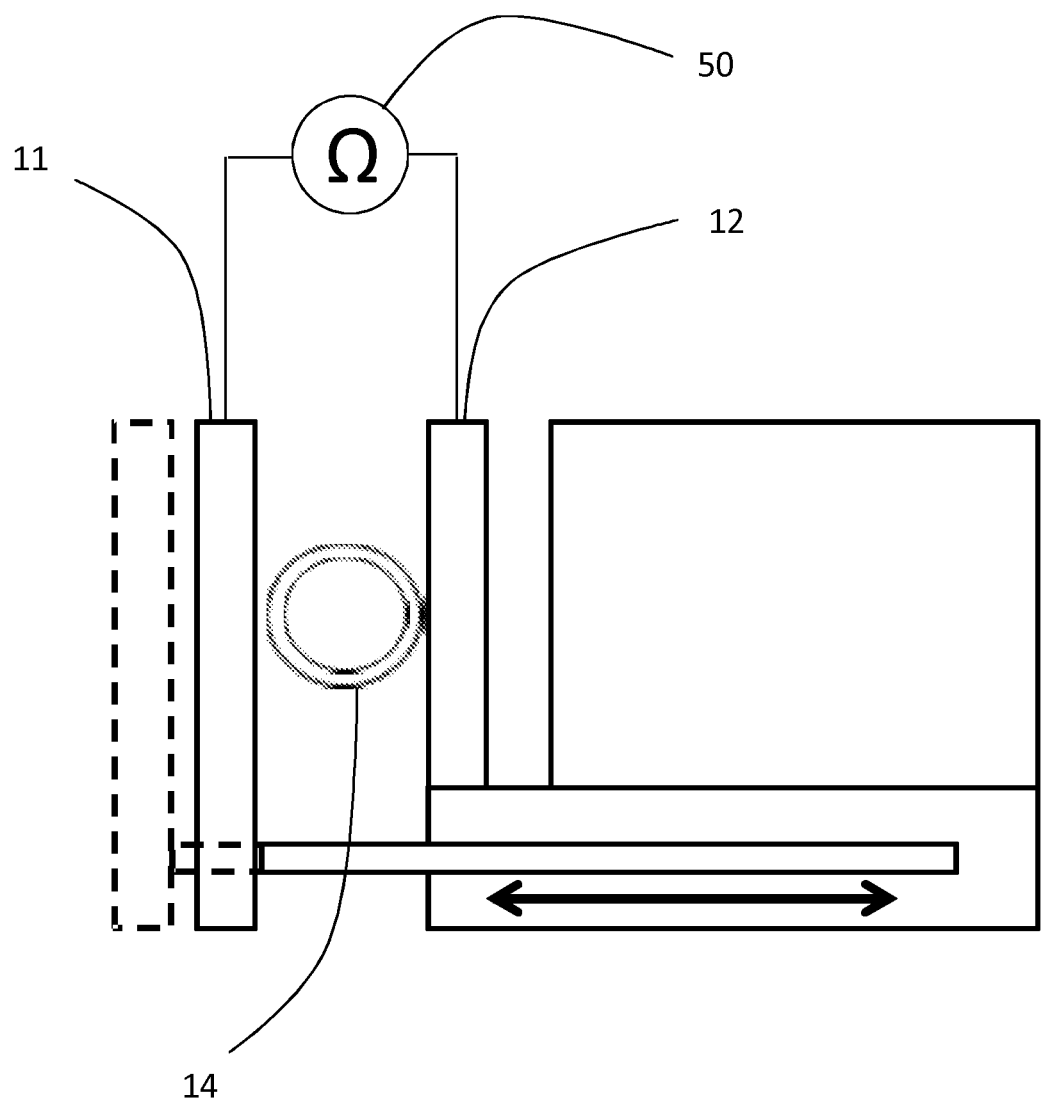
FIG. 5 shows an embodiment of a conductance measurement device.

In FIG. 5 a preferred embodiment of a conductance sensor is shown.

It comprises an Ohm-meter 50 coupled to the electrodes 11, 12 (or 21, 22). When there is a gap between the electrodes, i.e. no object present, the conducactance G is of course zero (R=∞; G=1/R), and if an object 14 exhibiting non-zero conductance a signal will be sent to the processor 18. Any other set-up for measuring conductance is of cores equally possible and is within the inventive idea.

The power source 20 may comprise a battery which is activated by a control signal 34 from the processor 18. When the actuator 25 is activated, either by pressing a button 31 or by detecting the presence of an object in the gap 13, the gap is reduced. In case where the second sensor and/or third sensor is implemented, signals are forwarded to the processor 18, which sends an enable signal (as indicated by 38) to the actuator before it may be activated. When the object 14 (inserted between the electrodes) is squeezed, the processor 18 receives signals from the clamping force detector 26 (as indicated by 38) and the first sensor 23 (as indicated by 37). The processor 18 thereafter calculates the required time and/or energy needed to perform the welding procedure.

The processor 18 in FIGS. 3 and 4 may further be configured to calculate time and/or amount of energy required to perform the welding procedure when the determined clamping force exceeds a predetermined value to ensure that the object is sufficiently squeezed before the welding procedure commences.

The processor 18 is also configured to compare any of the properties measured by means of the detector/sensors with a threshold value for each property. Said threshold values are selected so as to guarantee that the welder always will be operable for the intended materials, and always will be in-operable if e.g. a finger is inserted in the gap.

FIG. 6 shows a flow chart describing a method to perform a welding procedure in general.

The flow starts at step 40, and an object 14 with an electrically non-conductive surface is placed in a gap 13 between two electrodes 11, 12; 21, 22 in step 41. The actuator 15, 25 is activated in step 42 to move at least one of the electrodes 11; 21, 22 in relation to the other electrode to squeeze the object 14 between the electrodes.

In step 43, a clamping force is determined when the object 14 is squeezed between the electrodes 11, 12; 21, 22, and a distance between the electrodes when the object 14 is squeezed between the electrodes 11, 12; 21, 22 is measured in step 44.

The time and/or energy required to perform the welding procedure on the inserted object 14 is calculated in the processor 18 in step 45 based on the determined clamping force and the measured distance between the electrodes, and the energy emitted from the power source 20 is controlled by the processor 18 based on the calculated time and/or energy in step 46.

In step 47, energy is provided from the power source and controlled by the processor 18 to said electrodes to perform the welding procedure, and the flow is completed in step 48.

Step 45 may further comprise calculating time and amount of energy required to perform the welding procedure when the determined clamping force exceeds a predetermined value to ensure that the object is sufficiently squeezed before the welding procedure commences.

The welding techniques that are commonly used for welding plastic tubes and sheets are dielectric welding using RF energy, or alternatively ultrasound welding, but other types of welding techniques may be implemented in the welding apparatus according to the invention.

Figure 7:
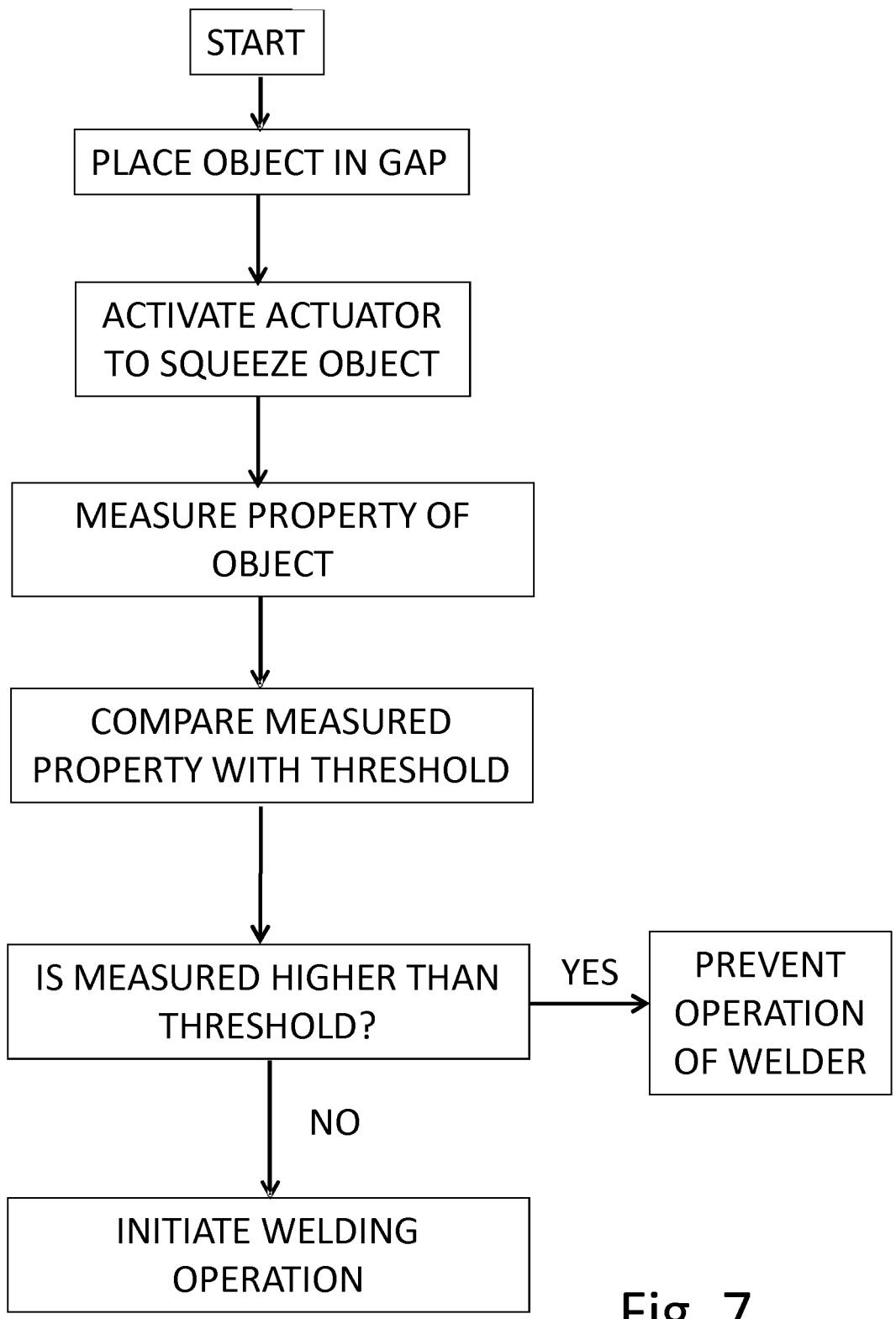
FIG. 7 shows a flow chart describing operation of a welding procedure featuring a safety aspect.

FIG. 7 shows the safety aspect in flow chart form.

Thus, an object is placed in the gap (either an appropriate object, such as a tube, or some object that is not appropriate, such as a finger). The actuator is activated so as to start squeezing the object between electrodes. In the process clamping force, distance and conductance are measured. If the measured values are higher than the set threshold value for the property in question, indicating that it is not a plastic tube, operation is terminated, i.e. no welding can be initiated.

If on the other hand the measured values are within the acceptable range (i.e. lower than the threshold value) welding is begun as soon as the other required conditions are met.

The invention claimed is:

1. A welding apparatus having a safety feature, said welding apparatus comprising:
    two electrodes, whereof at least one of said two electrodes is movably arranged in relation to the other electrode, said two electrodes are in non-contact with each other and define a gap in which an object to be sealed and having an electrically non-conductive surface may be inserted;

an actuator configured to move said at least one movably arranged electrode when activated, so as to squeeze the object when the object is inserted in the gap; and an energy source configured to provide energy to said electrodes to perform a welding procedure;

wherein said welding apparatus further comprises:

1) a detector configured to determine a clamping force when the inserted object is squeezed between the electrodes, 2) a distance sensor configured to measure a distance between the electrodes when the object is squeezed, and 3) a conductance sensor configured to measure a conductance of the object located between the electrodes when the object is squeezed;

wherein said welding apparatus further comprises a processor configured to process an input from at least one of the detector, the distance sensor, and the conductance sensor to provide an output that indicates whether the object inserted between the electrodes is a blood bag tube or a foreign object; and wherein the processor stores threshold values for distance and conductance in a memory, whereby the output from the processor comprises a comparison of sensor outputs from the distance sensor and the conductance sensor with the stored threshold values.

2. The welding apparatus according to claim 1, wherein the processor stores clamping force profiles for various material types, whereby the output from the processor comprises a comparison of a detector output from the detector with the stored clamping force profiles.

3. The welding apparatus according to claim 1, wherein said distance sensor is configured to measure the distance between the electrodes by monitoring movement of the at least one movably arranged electrode in relation to the other electrode.

4. The welding apparatus according to claim 1, wherein said distance sensor is an optical rangefinder.

5. The welding apparatus according to claim 1, wherein a further sensor is provided to detect if the object is partly outside the defined gap, and said processor is further configured to prevent the actuator from being activated when the object is detected to be partly outside the defined gap.

6. The welding apparatus according to claim 5, wherein said further sensor is integrated into said distance sensor.

7. The welding apparatus according to claim 1, wherein a position sensor is provided to detect a position of the object inserted between the electrodes, and said processor is further configured to enable activation of said actuator when the position sensor detects that the object has been placed between the electrodes.

8. The welding apparatus according to claim 7, wherein said actuator is activated when said position sensor detects the object within the gap.

9. The welding apparatus according to claim 1, wherein at least one of said electrodes is stationary.

10. A welding apparatus having a safety feature, said welding apparatus comprising:

two electrodes, whereof at least one of said two electrodes is movably arranged in relation to the other electrode, said two electrodes are in non-contact with each other and define a gap in which an object to be sealed and having an electrically non-conductive surface may be inserted;

an actuator configured to move said at least one movably arranged electrode when activated, so as to squeeze the object when the object is inserted in the gap; and an energy source configured to provide energy to said electrodes to perform a welding procedure;

wherein said welding apparatus further comprises:

1) a detector configured to determine a clamping force when the inserted object is squeezed between the electrodes, 2) a distance sensor configured to measure a distance between the electrodes when the object is squeezed, 3) a conductance sensor configured to measure a conductance of the object located between the electrodes when the object is squeezed, and 4) a position sensor configured to detect a position of the object inserted between the electrodes;

wherein the welding apparatus further comprises a processor configured to process an input from at least one of the detector, the distance sensor, and the conductance sensor to provide an output that indicates whether the object inserted between the electrodes is a blood bag tube or a foreign object;

wherein the processor comprises a memory storing threshold values for distance and conductance in the memory, whereby the output from the processor comprises a comparison of sensor outputs from the distance sensor and the conductance sensor with the stored threshold values; and wherein the memory further stores clamping force profiles for various material types, whereby the output from the processor comprises a comparison of a detector output from the detector with the stored clamping force profiles.

* * * * *